United States Patent [19]

Kishimoto

[11] Patent Number: 5,650,949

[45] Date of Patent: Jul. 22, 1997

[54] ELECTRONIC SURVEY INSTRUMENT

[75] Inventor: Hiroshi Kishimoto, Yokohama, Japan

[73] Assignee: Nikon Corporation, Tokyo, Japan

[21] Appl. No.: 636,909

[22] Filed: Apr. 22, 1996

Related U.S. Application Data

[63] Continuation of Ser. No. 478,749, Jun. 7, 1995, abandoned, which is a continuation of Ser. No. 181,440, Jan. 14, 1994, abandoned.

[30] Foreign Application Priority Data

Jan. 14, 1993 [JP] Japan .................. 5-022103
Feb. 23, 1993 [JP] Japan .................. 5-057918

[51] Int. Cl.⁶ ..................... G05B 19/16; G01B 7/004
[52] U.S. Cl. ............................ 364/579; 364/561
[58] Field of Search ..................... 33/291; 356/3; 364/561, 579

[56] References Cited

U.S. PATENT DOCUMENTS

| | | | |
|---|---|---|---|
| 3,836,851 | 9/1974 | Schumann | 324/112 |
| 4,099,240 | 7/1978 | Rode et al. | 364/607 X |
| 4,162,531 | 7/1979 | Rode et al. | 364/487 X |
| 4,717,251 | 1/1988 | Wells et al. | 356/3 X |
| 4,812,996 | 3/1989 | Stubbs | 364/487 |
| 4,839,967 | 6/1989 | Huei-Chin | 33/228 |
| 5,075,772 | 12/1991 | Gebel | 348/135 |
| 5,291,262 | 3/1994 | Dunne | 356/5 |
| 5,361,217 | 11/1994 | Makimura et al. | 356/3 X |

FOREIGN PATENT DOCUMENTS

| | | |
|---|---|---|
| 2-262005 | 10/1990 | Japan . |
| 3-245010 | 10/1991 | Japan . |
| 2 229 822 | 10/1990 | United Kingdom . |

OTHER PUBLICATIONS

Patent Abstracts of Japan, vol. 14, No. 50 (P-0998) 30 Jan. 1990 (JP-A-01 279 486).

Primary Examiner—Edward R. Cosimano

[57] ABSTRACT

An electronic survey instrument provided with an electronically controlled survey unit for metering at least one of a distance and an angle. A storage unit having two memory devices is provided for storing an operating system, a control program on one device and data on the other. The control program is created on a stand alone computer on the basis of the operating system. A central processing unit outputs a control signal for the electrically controlled survey unit in accordance with the operating system and the control program. A communication interface converts the control signal from the central processing unit into a signal suitable for the electrically controlled survey unit, and transmits the converted signal to the electrically controlled survey unit.

6 Claims, 7 Drawing Sheets

FIG. 5A  PROGRAM DEVELOPMENT
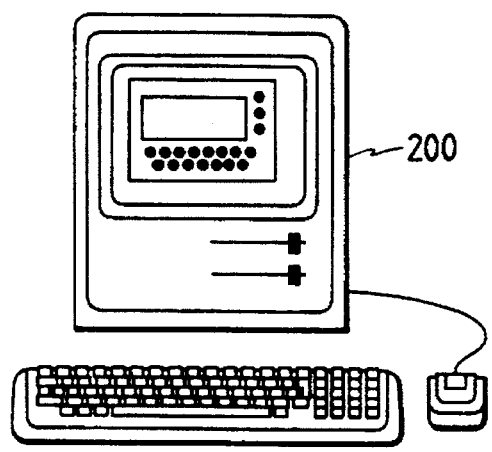
FIG. 5B  STORE PROGRAM IN MEMORY CARD
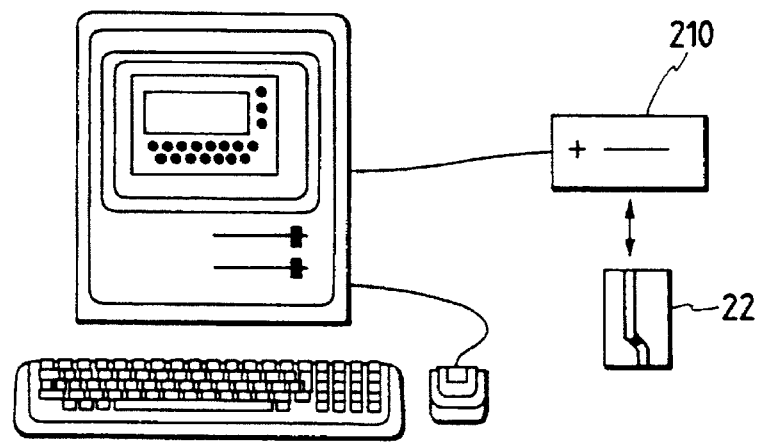
FIG. 5C  EXECUTE PROGRAM WITH SURVEY INSTRUMENT
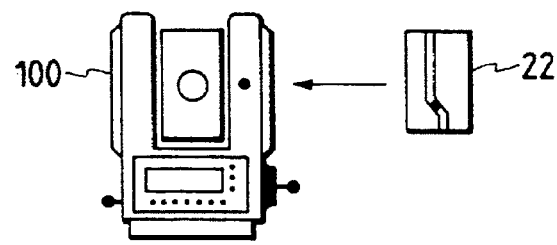

ELECTRONIC SURVEY INSTRUMENT

This application is a continuation of application No. 08/478,749, filed Jun. 7, 1995, now abandoned, which is a continuation of application No. 08/181,440, filed Jan. 14, 1994, now abandoned.

BACKGROUND OF THE INVENTION

1. Field of the Invention

The present invention relates to an electronic survey instrument, which operates in accordance with survey mechanism control programs created by an operating system used in a versatile computer such as a personal computer.

2. Related Background Art

A conventional electronic survey instrument is controlled by a CPU and a control program which defines the operation of a CPU. However, the conventional electronic survey instrument can load only a standard program for achieving relatively basic functions, and cannot satisfy all of various requirements which vary, depending on the fields of industries.

Recently, survey instruments which can exchange programs have been developed. For example, in Japanese Laid-Open Patent Application Nos. 2-262005 and 3-245010 describes a survey instrument comprising a single drive which receives a card comprising a memory element. The programs of this known survey instrument can be exchanged by using multiple cards which store various programs.

However, the CPU and program of this survey instrument are specific (special-purpose) ones as in the conventional instrument, and it is difficult for a user to improve a program. For this reason, users cannot individually create and use their own programs.

The conventional survey instrument also suffers from the following problems. In order to exchange a program or to copy surveyed data, the card must be temporarily ejected. Handling non-used cards at, e.g., an outdoor survey site is difficult. Further, when a user erroneously inserts a data storage medium in place of a program storage medium, or vice versa, a non-intended operation may be performed.

SUMMARY OF THE INVENTION

It is the first object of the present invention to provide a survey instrument which allows easy development of various programs.

It is the second object of the present invention to provide a survey instrument, which can facilitate handling (e.g., exchange, carrying, storage, and the like) of storage media.

In order to achieve the above objects, an electronic survey instrument according to the present invention comprises a CPU which operates in accordance with a versatile operating system, an interface for supplying a control signal from the CPU to an actual survey means, and a drive device for receiving a storage medium which stores a control program developed on a computer using the versatile operating system.

Furthermore, the drive device comprises two drive units which allow easy handling of storage media, and storage medium discrimination means. The discrimination means discriminates whether a storage medium inserted in one or both of the two drive units is a program storage medium or a data storage medium.

BRIEF DESCRIPTION OF THE DRAWINGS

FIGS. 5A to 5C are views showing the operation of the electronic survey instrument;

DESCRIPTION OF THE PREFERRED EMBODIMENTS

Figure 1:
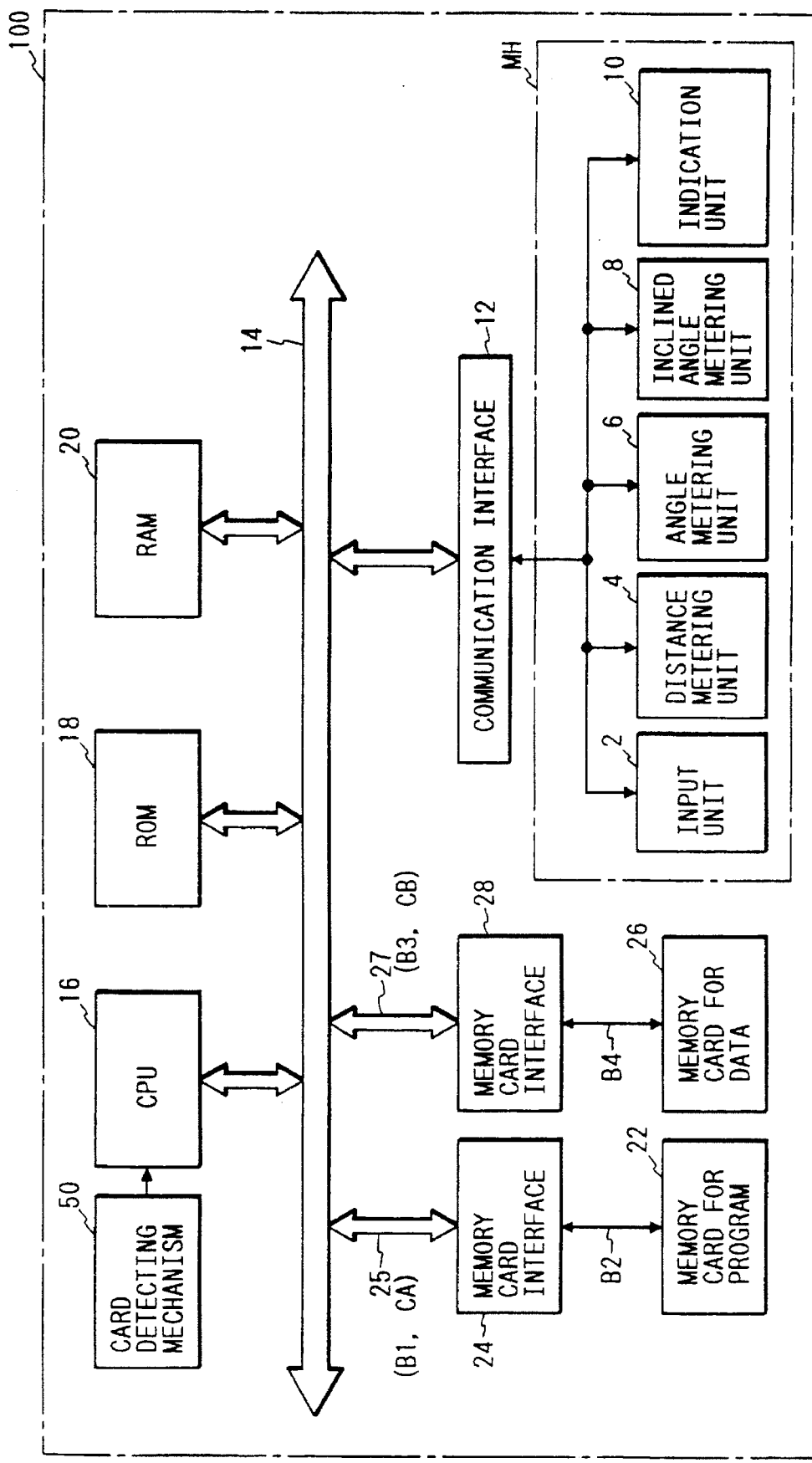
FIG. 1 is a block diagram showing an arrangement of an electronic survey instrument according to an embodiment of the present invention.
Figure 2:
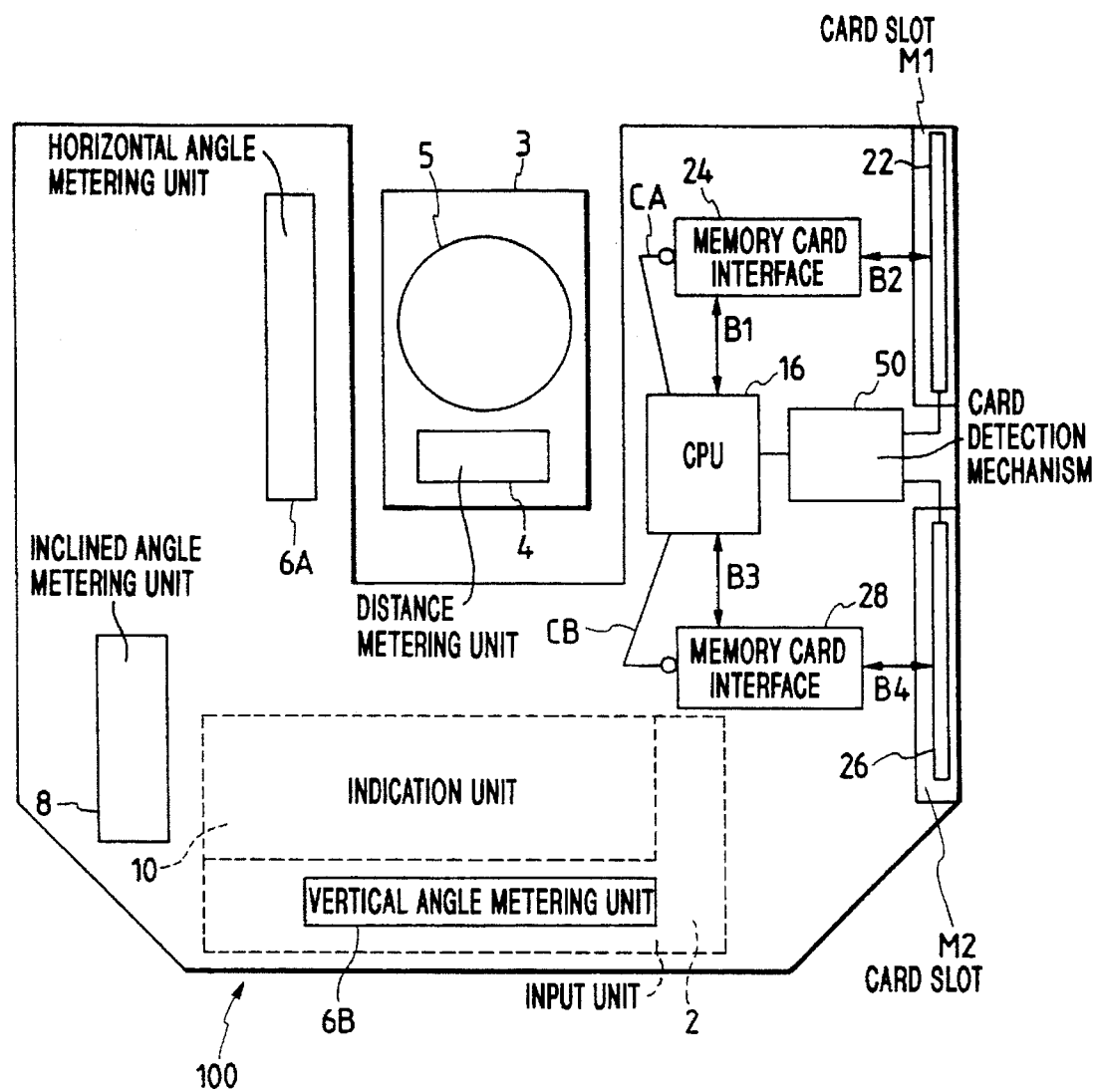
FIG. 2 is a view showing the positional relationship of components shown in FIG. 1.

An electronic survey instrument according to an embodiment of the present invention will be described hereinafter with reference to the accompanying drawings. As shown in FIG. 1, the electronic survey instrument comprises, in a main body 100, a survey instrument hardware unit MH, a communication interface 12, and a control system including a CPU 16. The survey instrument hardware unit MH comprises an input unit 2, a distance metering unit 4, an angle metering unit 6, an inclined angle metering unit 8, and an indication unit 10. The input unit 2 has a plurality of key switches, buttons, and the like which are used by an operator to enter a survey instruction, data necessary for survey. The input unit 2 the like, and is arranged on the surface of the survey instrument main body at a position indicated by a dotted line in FIG. 2 in a substantially L-pattern. The distance metering unit 4 is a unit for metering the distance from a point where the survey instrument main body is placed to a target point where a target is placed. As shown in FIG. 2, the distance metering unit 4 is arranged in a rotary unit 3 together with a collimating telescope 5, and is electrically connected to the main body via a horizontal rotational shaft (not shown). The rotational shaft is formed into a cylindrical shape, and signal lines are arranged to electrically connect the rotary unit 3 and the main body 100.

The angle metering unit 6 is a unit for metering the angle of the target point. The angle metering unit 6 comprises a horizontal angle metering unit 6A (see FIG. 2) for metering a rotational angle obtained when the survey instrument main body 100 is rotated about a vertical rotational shaft, and a vertical angle metering unit 6B (see FIG. 2) for metering a vertical angle obtained when the rotary unit 3 is rotated about the horizontal shaft. The inclined angle metering unit 8 is a unit for metering an inclined angle indicating a slight inclination of the main body 100, and is arranged in the main body 100 at the position illustrated in FIG. 2. The indication unit 10 is a rectangular liquid crystal indicator which is arranged on the surface of the main body 100 at a position indicated by a dotted line in FIG. 2, and indicates metering results from the angle metering unit 6 and the inclined angle metering unit 8, instructions for a user, and the like.

As shown in FIG. 1, the survey instrument hardware unit MH is connected to the CPU 16 via the communication interface 12 and a bus 14. The CPU 16 outputs various commands necessary for performing a survey to the distance metering unit 4, the angle metering unit 6, and the inclined angle metering unit 8 in the survey instrument hardware unit MH in accordance with a measurement instruction and data input via the input unit 2, and a control program stored in a ROM 18. These commands are converted by the communication interface 12 into signals compatible with the distance metering unit 4, the angle metering unit 6, and the inclined angle metering unit 8. The converted signals are supplied to the distance metering unit 4, the angle metering unit 6, and the inclined angle metering unit 8 in a standardized communication procedure. Data obtained by the distance metering unit 4, the angle metering unit 6, and the inclined angle metering unit 8 are supplied to the communication interface 12 in a standardized communication procedure, and are also supplied to the CPU 16 via the bus 14 for processing. The CPU 16 obtains desired metering values by executing a predetermined arithmetic process, and stores the metering values in a RAM 20. The CPU 16 also causes the indication unit 10 to indicate the metering values via the bus 14 and the communication interface 12.

The CPU 16 is also connected to the ROM 18, the RAM 20, and memory card interfaces 24 and 28 via the bus 14, in addition to the above-mentioned communication interface 12. The ROM 18 stores an operating system and a control program for controlling the CPU 16. The RAM 20 stores data generated by the process of the CPU 16, metering data obtained by the respective units, and the like.

The interfaces 24 and 28 are respectively connected to card slots M1 and M2, as shown in FIG. 2. The card slots M1 and M2 are respectively arranged at upper and lower positions on a side portion of the survey instrument main body 100. The interfaces 24 and 28, and the card slots M1 and M2 constitute drive units for memory cards used as a storage media.

A memory card 22 for a program shown in FIG. 1, preferably comprises a semiconductor memory card for storing a control program for controlling the CPU 16 to execute a predetermined process. The memory card 22 is inserted into one of the card slots M1 and M2, formed at the upper and lower positions on the side portion of the survey instrument main body 100 shown in FIG. 2. A program stored in the memory card 22 is read out via the memory card interface 24 to the bus 14 and is loaded in the RAM 20 under the control of the CPU 16.

Similarly, a memory card 26 for data preferably comprises a semiconductor memory card for storing data obtained as a result of the process of the CPU 16. The memory card 26 can be inserted in either of the card slots M1 and M2 formed at the upper and lower positions on the side portion of the survey instrument main body 100 shown in FIG. 2. Data temporarily stored in the RAM 20 in the main body 100 is written and stored in the memory card 26 for data under the control of the CPU 16.

The drive units each comprising a card slot and an interface are also connected to a card detecting mechanism 50. The detecting mechanism 50 detects whether or not memory cards are inserted in the respective card slots M1 and M2. The detecting mechanism 50 outputs a signal indicating the presence/absence of card insertion from the detecting mechanism 50 to the CPU 16.

Upon reception of a signal indicating insertion of a card in the card slot M1 from the detecting mechanism 50, the CPU 16 enables the interface 24, via a control line CA included in a bus 25. Thereafter the CPU 16 makes a read or write access to the memory card inserted in the card slot M1 via a data bus B1 included in the bus 25, the interface 24, and a data bus B2. Similarly, upon reception of a signal indicating insertion of a card in the card slot M2 from the detecting mechanism 50, the CPU 16 enables the interface 28 via a control line CB included in a bus 27, and thereafter makes a read or write access to the memory card inserted in the card slot M2 via a data bus B3 included in the bus 27, the interface 28, and a data bus B4.

As described above, either the memory card 22 for a program or the memory card 26 for data can be inserted in either the memory card slot M1 or M2. FIGS. 1 and 2 illustrate a state wherein the memory card 22 for a program is inserted in the memory card slot M1, and the memory card 26 for data is inserted in the memory card slot M2. In this case, the card detecting mechanism 50 detects that the memory card for a program is inserted in the card slot M1. Therefore, the CPU 16 reads out a program via the drive unit at the side of the card slot M1. Since the card detecting mechanism 50 also detects that the memory card for data is inserted, data is written in the inserted memory card for data via the drive unit at the side of the card slot M2.

Figure 3:
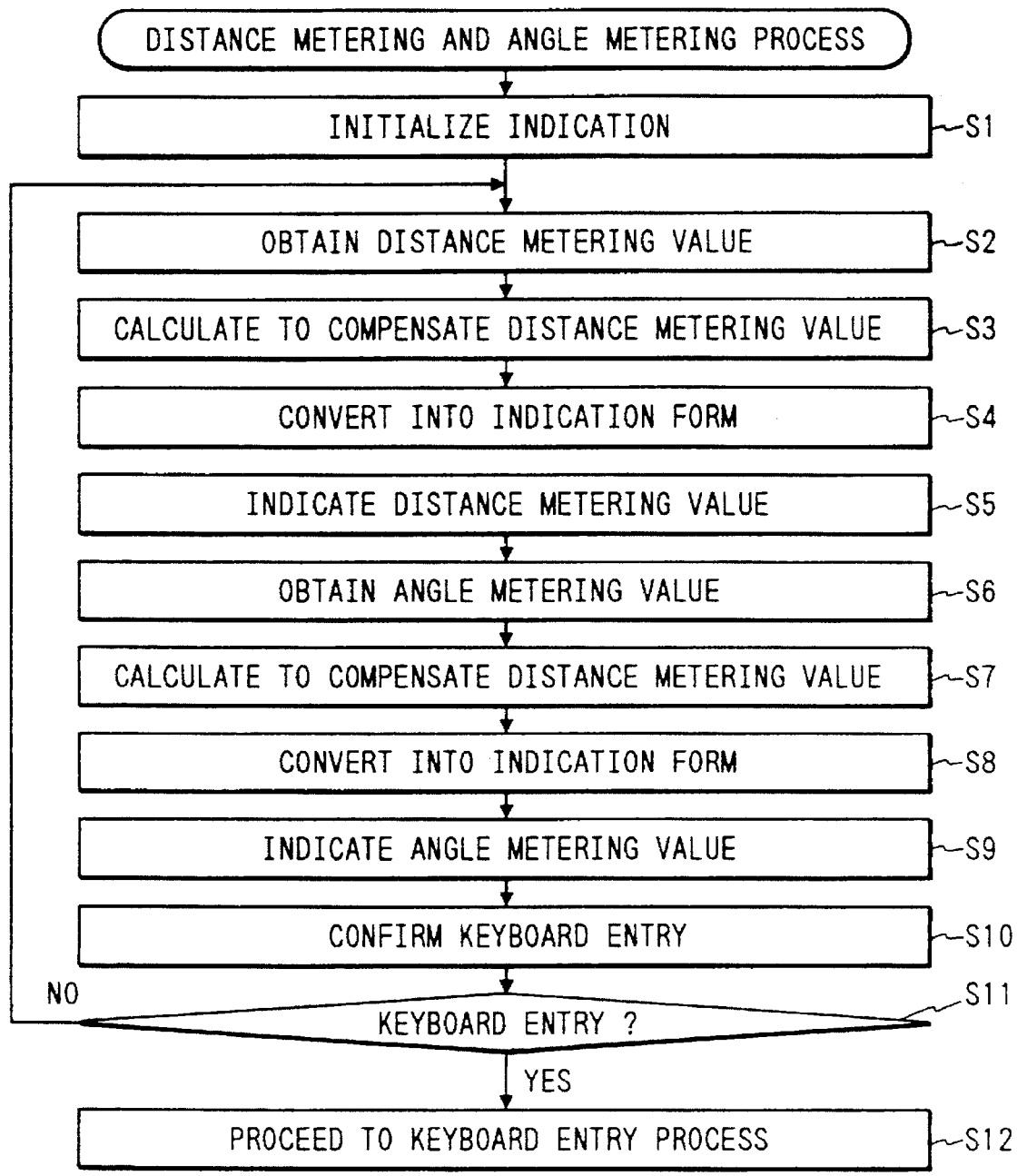
FIG. 3 is a partial flow chart of a control program of the survey instrument.

Some operations of the electronic survey instrument will be described below with reference to FIGS. 3 to 5C. FIG. 3 is a flow chart showing a distance metering program and an angle metering program which are part of the control program stored in the memory card 22.

Upon reception of distance and angle metering instructions from the input unit 2, the CPU 16 changes the indication content of the indication unit accordingly (step S1). At this time, the CPU 16 causes the indication unit 10 to change its indication content, and instructs the distance metering unit 4, the angle metering unit 6, and the inclined angle metering unit 8 to start metering. An operator adjusts the directions of the main body 100 and the rotary unit 3 to a target set on a target point on the basis of the changed indication content.

The CPU 16 instructs the distance metering unit 4, via the bus 14 and the communication interface 12, to obtain a signal indicating a distance metering value obtained by metering (step S2). Furthermore, the CPU 16 obtains signals indicating angle metering values, from the angle metering unit 6 and the inclined angle metering unit 8, and performs a calculation to compensate for the distance metering value using these angle metering values (step S3). When the survey site corresponds to a slope, a difference is generated between the horizontal distance from the survey instrument to the target and the actual distance therebetween depending on the angle of the slope. The CPU 16 performs the compensation calculation in step S3 to remove such a difference (error) from the metering value.

Error factors include the inclination upon setting of the survey instrument, the height of a metering reference point of the survey instrument main body, compensation constants for the height and distance of a metering reference point of a target, the temperature, the atmospheric pressure, and the like. These error factors are normally acquired by one of two methods, and are input to the CPU 16 upon calculation. In the first method, an operator meters the error factors in advance and stores the metering values in the RAM 18, on the basis of an instruction from the CPU 16, while observing the indication on the indication unit 10. In the second method, the error factors are metered by metering units such as the inclined angle metering unit 8 assembled in the survey instrument main body or a target, as needed, and are read out when a compensation calculation is required.

When the CPU 16 obtains a proper distance metering value by the compensation calculation in step S3, it converts the compensated distance metering value into an indication form (step S4), and causes the indication unit 10 to indicate the metering value via the bus 14 and the communication interface 12 (step S5).

Then, the CPU 16 obtains an angle metering value from the angle metering unit 6, via the bus 14 and the communication interface 12, (step S6). Thereafter, the CPU 16 performs a calculation to compensate for the angle metering value using required compensation values as in step S3 (step S7). The CPU 16 then converts the compensated angle metering value into an indication form (step S8), and causes the indication unit 10 to indicate the metering value via the bus 14 and the communication interface 12 (step S9).

The CPU 16 checks a keyboard entry, i.e., whether a keyboard operation from the input unit 2 is performed, (step S10) to check the presence/absence of a keyboard entry (step S11). If a keyboard entry is detected, a corresponding process is executed (step S12); otherwise, the processes in steps S2 to S10 are repeated. The input unit 2 has a plurality of keys, and generates and holds a key flag in units of keys every time a key is operated. Therefore, the CPU 16 checks for key flags to determine the presence/absence of a keyboard entry in steps S10 and S11.

When the distance metering and angle metering programs are started, metering is repeated until a key of the input unit 2 is operated, and when a key is operated, an operation corresponding to the operated key is executed. When a key for storing metering values is operated, the CPU 16 generates an interrupt in step S11, temporarily stores the metering values in the RAM 18 in step S12, and causes the indication unit 10 to change its indication content.

In the case of the distance metering program, steps S6 to S9 are omitted, and in the case of the angle metering program, step S2 to S5 are omitted.

The above-mentioned control program is merely an example, and may be changed to various ones upon creation of a program. For example, compensation calculations are performed in steps S3 and S7. However, steps S3 and S7 may be omitted. Since the compensation calculation causes a calculation time difference depending on the number of parameters required for the calculation, the number of parameters must be adjusted as needed. Upon indication of metering values, units to be used, the number of digits, and the like must be taken into consideration. These indication conditions vary depending on programs. Also, there are many the processes which may be programmed in addition to the flow chart shown in FIG. 3. For example, these processes include a process for determining the storage timing and procedure of the indicated metering values, a process for determining whether compensated data or metering values before calculation are stored, and the like. However, as described above, various cases are available depending on conditions upon creation of programs, and it is difficult to describe all these cases. Therefore, a detailed description thereof will be omitted here.

Development of the above-mentioned control program will be described below. The respective units in the survey instrument hardware unit MH are designed to perform predetermined operations in response to instructions from the CPU 16 in the form of commands.

This control program is created by a normal computer system, as described above. This computer system preferably operates on the same, or compatible, operating system as that used by the CPU 16 of the survey instrument.

Figure 4:
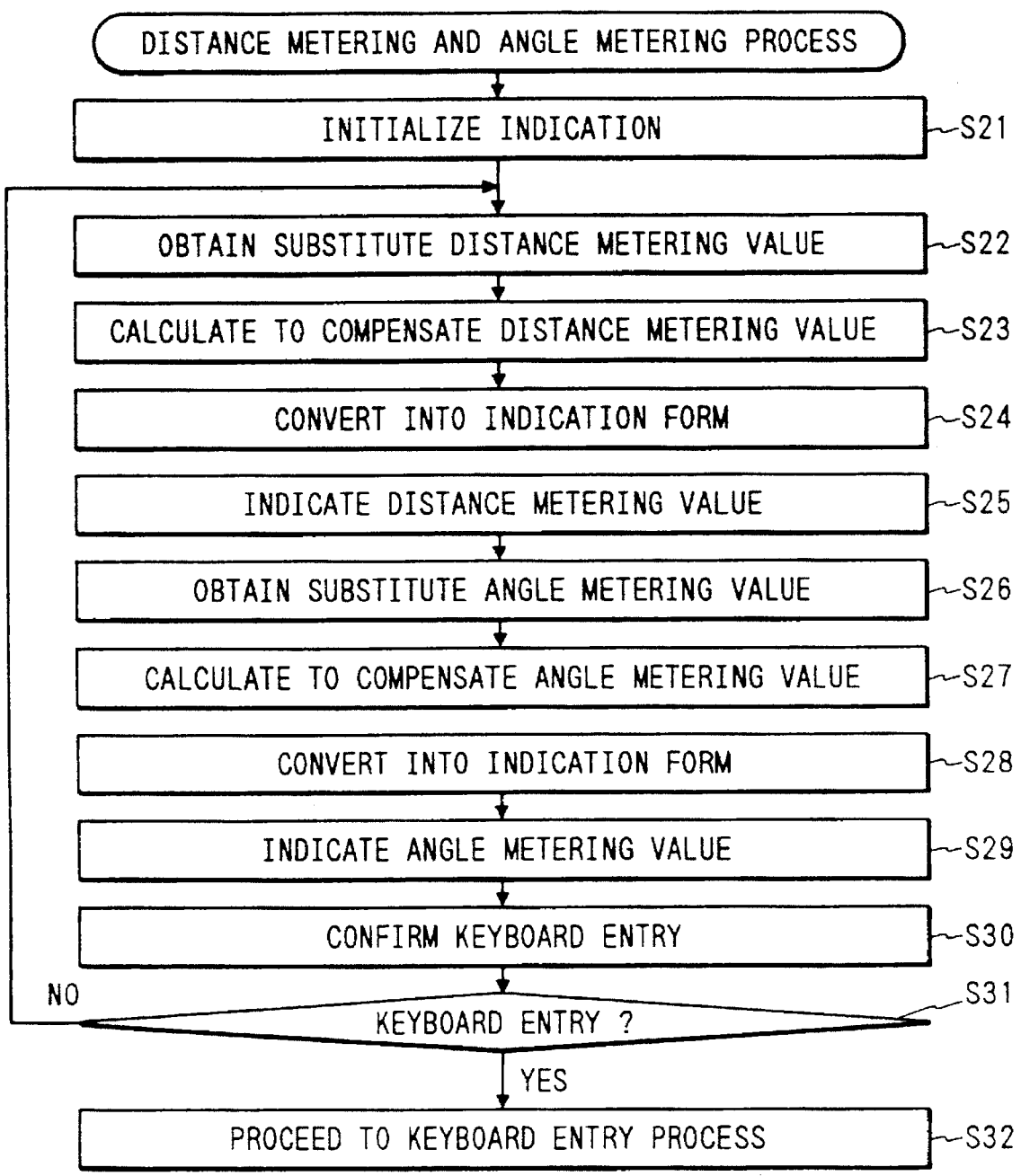
FIG. 4 is a partial flow chart of a control program on a computer system.

FIG. 4 shows a process sequence in the computer system corresponding to the control program shown in FIG. 3. More specifically, in order to operate the survey instrument of this embodiment in the process sequence shown in FIG. 3, a control program need only be developed to allow the process sequence shown in FIG. 4 to operate on the computer system.

The process sequence comprises steps S21 to S32 which substantially correspond to steps S1 through S12 in FIG. 3, with the exception of steps S22 and S26. Steps S22 and S26 are the steps of obtaining metering values. The survey instrument comprises the units for metering the distance, angle, and the like, but the computer system does not comprise any of these units. The computer system comprises functions of other units, e.g., the indication unit, the input unit, and the like. Therefore, the computer system achieves the steps of obtaining metering values (e.g., steps S2 and S6 in FIG. 3) by generating pseudo metering values. More specifically, as shown in FIG. 4, a substitute distance metering value (step S22) and a substitute angle metering value (step S26) are obtained by generating them on a program, so that a control program for the survey instrument can be developed on a normal computer.

Since the steps in FIG. 4 are substantially the same as the steps S1–S12, in FIG. 3, except for the above-mentioned steps S22 and S26, a detailed description thereof will be omitted. As in FIG. 3, step S11, in the process according to FIG. 4, the CPU checks a keyboard entry, i.e., whether a keyboard operation from the input unit 2 is performed (step S30) to check the presence/absence of a keyboard entry (step S31). If a keyboard entry is detected, a corresponding process is executed (step S32). Otherwise, the processes in steps S22 to S30 are repeated.

FIGS. 5A to 5C show a state wherein the program developed on a normal personal computer is stored in a memory card, as a standard auxiliary storage medium, and is executed in the survey instrument. As shown in FIG. 5A, a program is developed on a personal computer 200 which loads an operating system. Then, as shown in FIG. 5B, the created program is stored in the memory card 22 using a memory card drive 210 connected to the personal computer 200. Thereafter, as shown in FIG. 5C, the memory card 22 which stores the program is inserted in the card slot M1 or M2 of the survey instrument 100, and the program stored in the card 22 is executed in the survey instrument 100.

The electronic survey instrument 100 operates on the same operating system as that of the personal computer 200, and uses an auxiliary storage medium, which can be used in the personal computer 200. Therefore, when a plurality of auxiliary storage media (memory cards in this embodiment) of the same standard are prepared, and different control programs are stored in these media, the survey instrument operates according to various control programs. Since the survey instrument is designed to operate on the basis of the operating system, development of a control program is easy. More specifically, a user can create a control program as long as he or she understands the operating system and commands unique to the survey instrument even if he or she does not understand the details (e.g., characteristics, operations, and the like) of the CPU of the survey instrument.

A setting operation of the drive unit of the memory card will be described below. The electronic survey instrument of this embodiment comprises two memory card drive units, like two floppy disk drive units of a personal computer. In the case of a personal computer, a specific priority order is assigned to the drive units like drive units A and B or drive units 1 and 2, and the personal computer is designed not to operate unless a floppy disk is inserted in a predetermined drive unit. More specifically, a normal personal computer does not operate unless a program disk (or a startup disk) is inserted in a drive unit A (or a drive unit 1). However, the electronic survey instrument of this embodiment discriminates a card, and automatically sets discrimination of the drive units unlike the setting method of the drive units of the personal computer, as will be described below.

Figure 6:
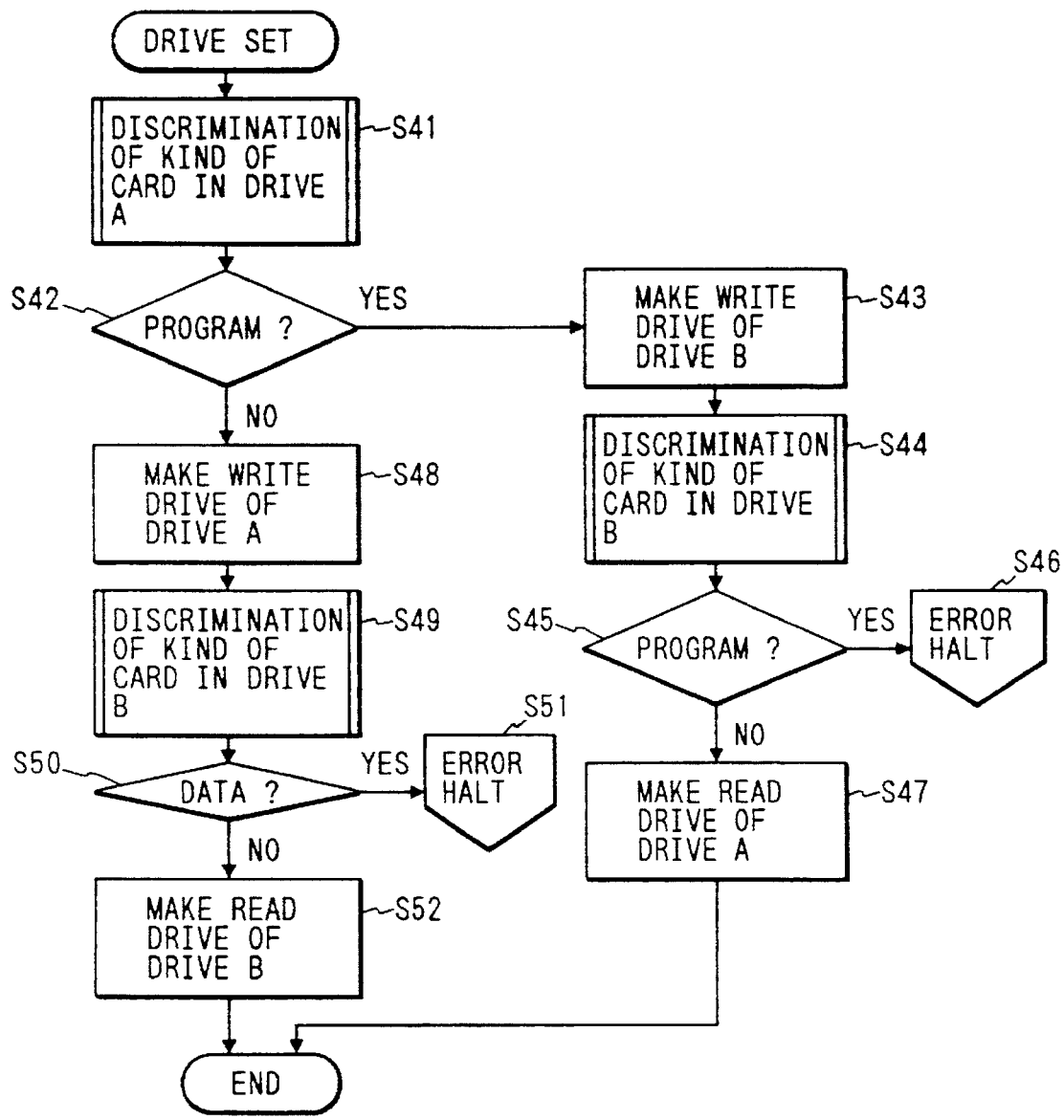
FIG. 6 is a flow chart showing an operation for setting a memory card drive device.
Figure 7:
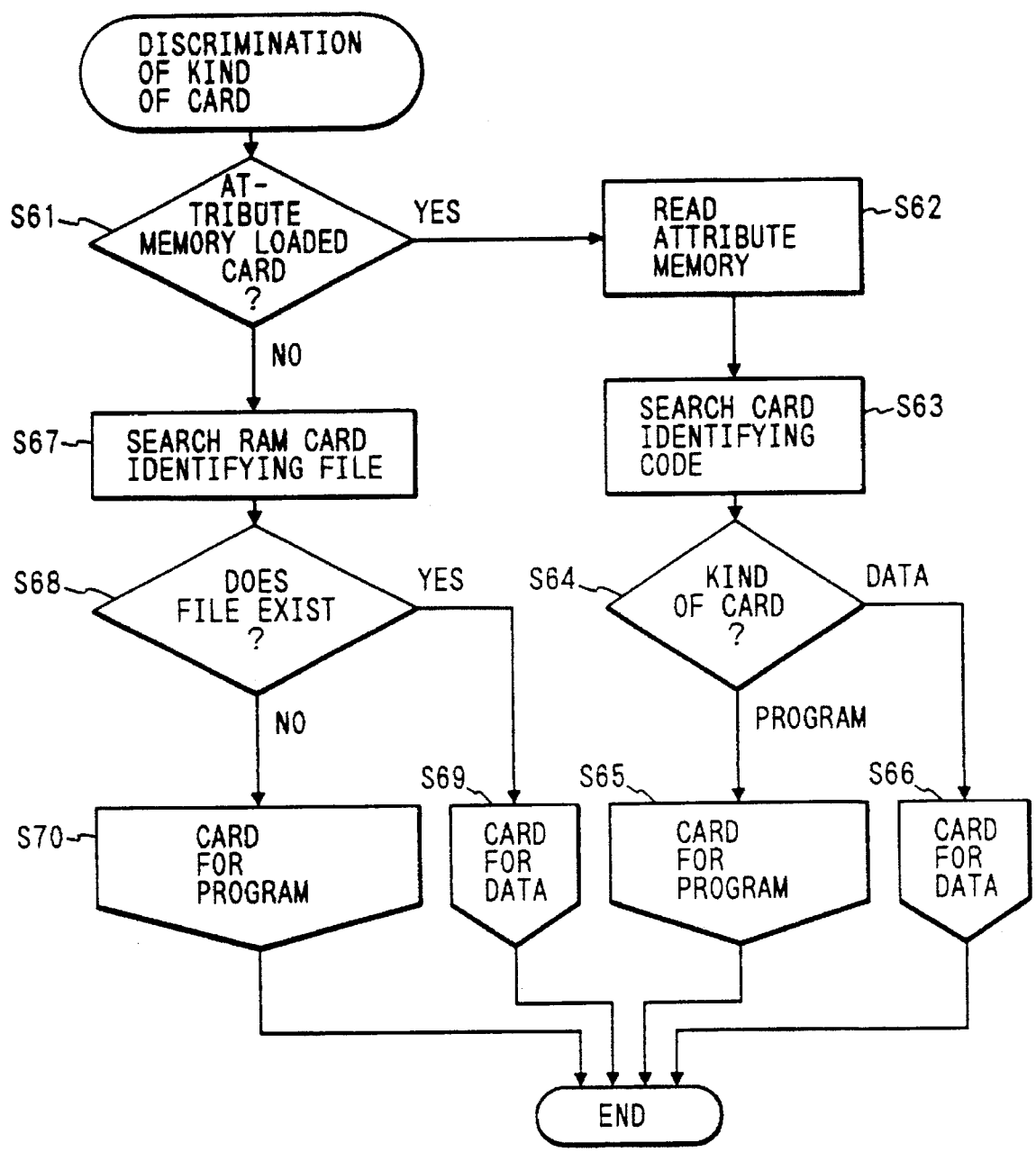
FIG. 7 is a flow chart showing an operation for discriminating a kind of memory card.

FIG. 6 is a flow chart showing an operation for setting memory card drive units, and FIG. 7 is a flow chart showing an operation for discriminating a memory card. As shown in FIG. 6, the CPU 16 discriminates the kind of a card inserted in a drive unit A (memory card slot M1) (step S41). This discrimination procedure will be described in detail later. If the CPU 16 determines that the inserted memory card is one containing a program (YES in step S42), it determines that a memory card inserted in the other drive unit B is a memory card for data, and sets the drive unit B (memory card slot M2) to be a data write drive unit (step S43).

Then, the CPU 16 discriminates the kind of a card inserted in the drive unit B (step S44). If the CPU 16 determines that the inserted memory card is one containing a program (YES in step S45), since this discrimination result conflicts against the result in step S43, it determines an error, and halts the processes (step S46). However, if the CPU 16 determines that the inserted memory card is one for containing data (NO in step S45), it sets the drive unit A to be a program read drive unit (step S47).

On the other hand, if the CPU 16 determines in step S42 that the card inserted in the drive unit A is one for containing data (NO in step S42), it sets the drive unit A as a data write drive unit (step S48).

Then, the CPU 16 discriminates the kind of a card inserted in the drive unit B (step S49). If the CPU 16 determines that the inserted memory card is one for containing data (YES in step S50), it determines an error in association with the result in step S42, and halts the processes (step S51). On the other hand, if the CPU 16 determines that the card inserted in the drive unit B is one containing a program, it sets the drive unit B to be a program read drive unit (step S52).

A process for discrimination of the kind of card as executed in steps S41, S44, and S49 shown in FIG. 6, will be described below. In this discrimination, it is discriminated by the CPU 16 if a memory card inserted in the card slot M1 or M2 is a memory card for a program or data. As shown in FIG. 7, the CPU 16 checks if the inserted memory card is an attribute memory loaded card (step S61). The attribute memory means a specific storage area allocated on the memory card, and this storage area is different from an area for storing normal data or a program.

If the inserted card is an attribute memory loaded card, the CPU 16 reads the attribute memory (step S62), and acquires a card identifying code stored in the memory (step S63). The CPU 16 discriminates the acquired card identifying code (step S64). If the card identifying code indicates a memory card for a program, the CPU 16 determines that the inserted card is a memory card for a program (step S65). If the card identifying code indicates a memory card for data, the CPU 16 determines that the inserted card is a memory card for data (step S66).

If the inserted memory card is not an attribute memory loaded card (NO in step S61), the CPU 16 searches a RAM card identifying file from the normal storage area of the memory card (step S67). If the RAM card identifying file exists (YES in step S68), the CPU 16 determines that the inserted card is a card for data (step S69). If the RAM card identifying file does not exist (NO in step S68), the CPU 16 determines that the inserted card is a card for a program (step S70).

As described above, since the electronic survey instrument executes processes after it discriminates whether the inserted memory card is one for a program or data, it does not erroneously operate regardless of whether the memory card is inserted in the card slot M1 or M2.

The electronic survey instrument can operate normally even if there is only one drive unit which operates normally. This control is realized by a process sequence programmed in a program. This function is particularly important when a use environment is severe like in a survey instrument.

The above-mentioned process sequence concerns discrimination of drive units, and an example of the discrimination will be explained below. The CPU 16 causes the card detecting mechanism 50 to detect that a memory card is inserted in the card slot, and then executes the operation for setting the drive units shown in FIG. 6. When the operation for setting the drive units is not executed even though a card is inserted, the CPU 16 determines an abnormality. Therefore, this abnormality includes a case wherein both the two drive units are abnormal, and a case wherein one drive unit is abnormal. When both the drive units are abnormal, since the memory card cannot be used, the CPU causes the indication unit to indicate malfunctions of the drive units, and ends the processes. When one drive unit malfunctions, since the other drive unit can be used, the CPU continues survey using this drive unit. In this case, two memory cards are used in one drive unit. In this case, although the memory cards must be replaced, the CPU 16 causes the indication unit to indicate a normal drive unit, and a message for replacing the memory card in the normal drive unit for an operator.

In this embodiment, the memory card is used as a storage medium. However, if the survey instrument comprises a drive unit corresponding to a storage medium, other storage media, such as a floppy disk, a magneto-optical disk, and the like may be used. If these storage media can be used, the survey instrument need not comprise any ram or ROM in its main body. In this case, an operating system is also stored in a storage medium, and the CPU controls the respective units while reading out the operating system and a control program stored in the storage medium.

The electronic survey instrument of the above embodiment comprises two memory card drive units. However, three or more drive units may be arranged. With this arrangement, at least one program card and two data cards can be inserted. In this case, if the same data are written in the two data cards, a data backup process can be realized. Alternatively, two program cards and one data card may be inserted. In this case, even if a control program is divisionally stored in the two memory cards, the program can be executed, and the surveyed data can be stored in the memory card.

As the kind of a memory card, a memory card may be designed to have both a program storage area for storing a program and a storage area for storing data. When such a memory card is used, a program read process and a data storage process can be achieved by a single memory card if the program size is proper. If a memory card for a program and a memory card for both a program and data are used, a program can be executed even if the program size is large, and data can be stored.

Although a few preferred embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An electronic survey instrument comprising:
   a survey instrument hardware unit for performing surveying operations in accordance with a control program and outputting measurement data;

a drive apparatus having a first and a second drive unit, each drive unit for receiving a memory selected from a program memory for storing the control program and a data memory for storing the measurement data from the survey instrument hardware unit, each of said memories being provided with an identifying code;

discriminating means for discriminating whether a memory inserted in one of said first and second drive units is one of said program memory and said data memory by reading said identifying code of the memory inserted in said one drive unit; and;

drive determining means for causing said first drive unit to operate as a reading drive and said second drive unit to operate as a writing drive or said first drive unit to operate as a writing drive and said second drive unit to operate as a reading drive, based on the output of said discriminating means.

2. An electronic survey instrument according to claim 1, wherein said discriminating means discriminates whether a memory inserted in said first drive unit is one of said program memory and said data memory after discriminating the memory inserted in said second drive unit; and wherein said drive determining means determines an error if said discriminating means discriminates that the memory inserted in said first drive unit and the memory inserted in said second drive unit are the same type of memory.

3. An electronic survey instrument according to claim 1, wherein said program memory is a memory card and said data memory is a memory card.

4. An electronic survey system comprising:

a survey instrument hardware unit for outputting a metering data corresponding to at least one of a metered distance and a metered angle having:

a storage medium for storing a control program;

a drive unit for driving said storage medium; and a central controlling unit operating in accordance with an operating system, said central controlling unit for controlling said survey instrument hardware unit in accordance with said control program; and a remote computer unit for producing said control program, said computer unit operating in accordance with said operating system and having a drive unit for recording the made control program in said storage medium.

5. An electronic survey system according to claim 4, wherein said computer unit has means for providing a pseudo metering data to said control program.

6. An electronic survey system according to claim 4, wherein said storage medium is a memory card.

* * * * *